United States Patent Office 3,204,458
Patented Sept. 7, 1965

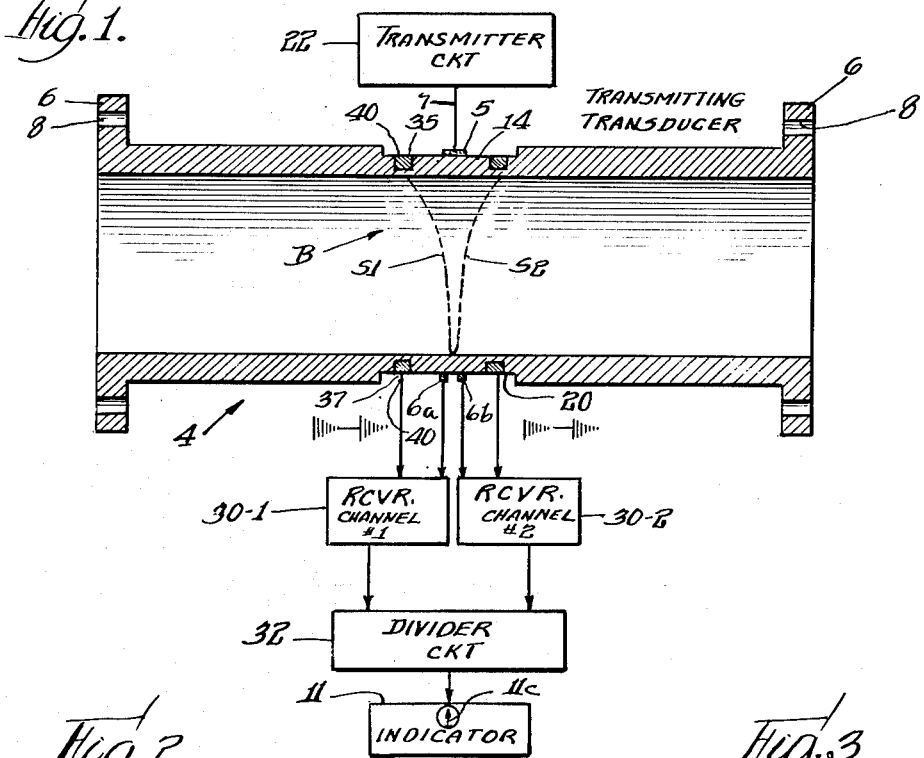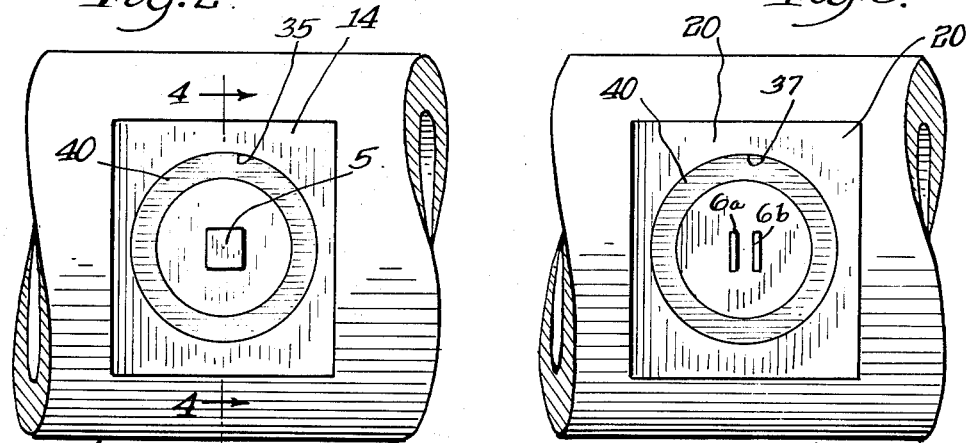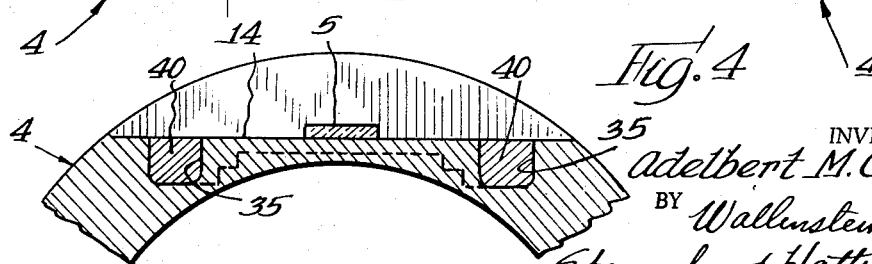

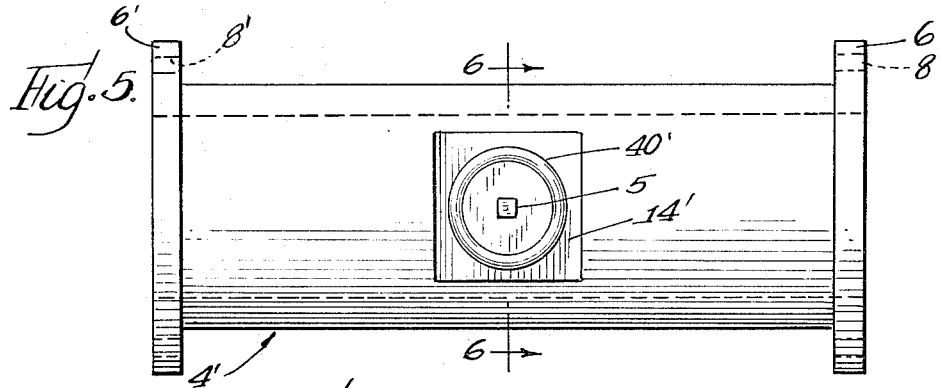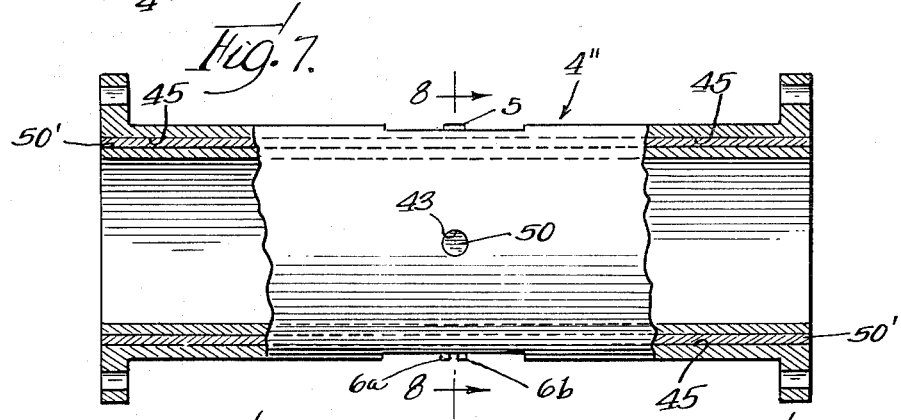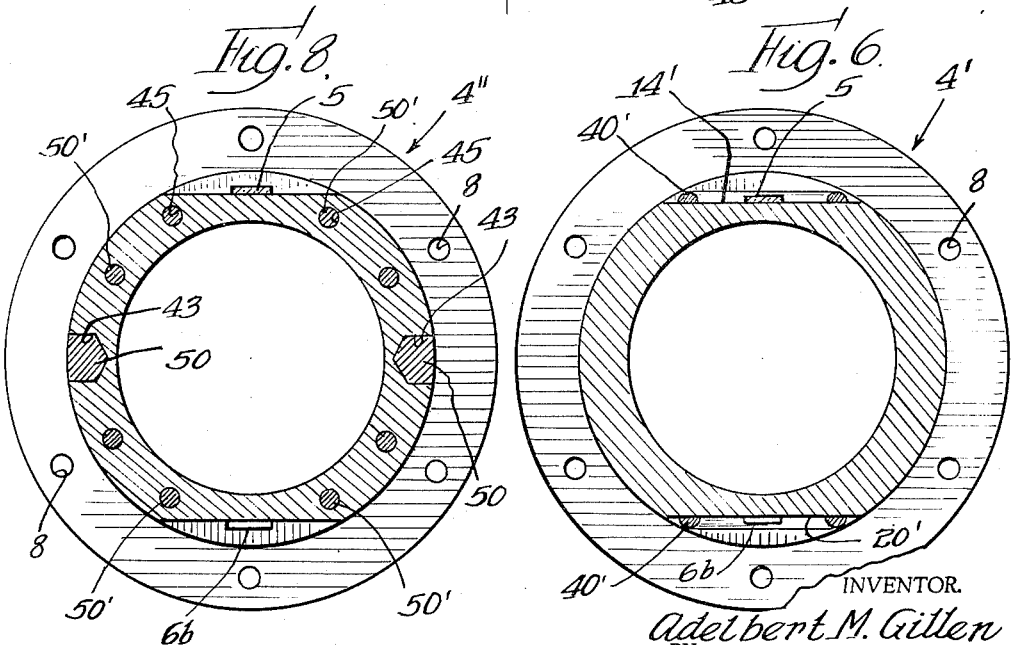

3,204,458
ULTRASONIC FLOWMETER
Adelbert M. Gillen, Atlantic Highlands, N.J., assignor to Gulton Industries, Inc., Metuchen, N.J., a corporation of New Jersey
Filed July 2, 1962, Ser. No. 206,689
8 Claims. (Cl. 73—194)

In recent years a new form of ultrasonic flowmeter has been developed operating on the deflection of an ultrasonic beam directed across a conduit carrying the fluid involved by the movement of the fluid in the conduit. The degree of deflection of the beam is a measure of the flow velocity. The beam pattern is such that the amplitude thereof varies along the axis of the conduit. A measure of the velocity of fluid flow can thus be obtained by obtaining a measure of the amplitude of the ultrasonic beam at a fixed point in the conduit.

It is most advantageous that the ultrasonic transmitting and receiving elements (referred to as transducers) be located on the outside of the conduit involved, so that no flow restrictions or corrosion problems are involved. To this end, a piezoelectric transmitting transducer is mounted on one side of a section of pipe carrying the fluid to be measured, and one or more piezoelectric receiving transducers are mounted on the opposite side of the pipe, the average wall thickness at the point of attachment of the transducers thereto preferably being in the neighborhood of a multiple of a half wave length at the frequency of the ultrasonic waves to be generated. The transmitting transducer vibrates the walls of the pipe to produce a laterally directive ultrasonic beam in the fluid flowing in the pipe. The beam directed across the pipe strikes the opposite inside wall thereof and in so doing sets up vibrations in the wall.

In one type of beam deflection flowmeter, a receiving transducer is located upstream and/or downstream from the transmitting transducer a distance less than the beam width so that the ultrasonic beam is detected thereby when the beam first strikes the pipe wall. This type of flowmeter has many advantages over other types of flowmeters wherein one or more receiving transducers are located a substantial distance downstream from the transmitting transducer, where the transmitted beam directed at an angle to the pipe axis reaches the point where a receiving transducer is mounted only after a number of reflections.

In the first-mentioned type of flowmeter, where the transmitting and receiving transducers are positioned close to one another on opposite sides of the pipe, under some circumstances appreciable amounts of the transmitted vibration energy may reach the receiving transducer directly through the walls of the pipe. The vibrations so received may interfere with or mask the signals received through the liquid flowing in the pipe, to create inaccuracies in the resulting measurement.

A substantial reduction in the coupling of vibrations between the transmitters and receiving transducers through the walls of the conduit has been achieved by the means disclosed and claimed in copending application Serial No. 168,145 of Glenn Howatt wherein discontinuities are formed in the conduit walls.

It is an object of the invention to provide an ultrasonic flowmeter of the type where transmitting and receiving transducers are mounted on the outside of a pipe wherein transmission of vibration energy to the receiving transducer directly through the walls of the pipe is greatly minimized and wherein additions are made to the improved flowmeters disclosed in said copending application further to reduce the coupling of vibrations between the transmitting and receiving transducers through the pipe walls. Another object of the invention is to provide vibration decoupling means in the type of ultrasonic flowmeter described, where, if desired, little or no discontinuities need be made in the walls of the pipe to avoid or minimize reduction in the strength of the conduit walls. Still another object of the invention is to provide improved vibration decoupling means in the pipe walls of the flowmeter described above which utilizes improved discontinuity patterns in the conduit walls.

In accordance with one aspect of the present invention, discontinuities in the form of recesses are formed in the walls of the pipe between the transmitting and receiving transducers. In one form of this aspect of the invention, the recesses include a pair of circular grooves respectively surrounding the transmitting and receiving transducers. In other forms of this aspect of the invention the recesses are axial and/or transverse bores formed in the pipe walls. The recesses referred to above are filled with a vibration absorbent material, such as lead or soft solder. The recesses serve the functions of holding the acoustic absorbent material securely on the pipe walls, reducing the amount of vibration conducting material in the pipe not otherwise needed for strength purposes, and diverting from the receiving transducers vibration energy which may be reflected at the interface of the recess walls and the vibration absorbent material and hence not absorbed by the vibration absorbent material. In order to maximize the amount of vibration energy absorbed by the vibration absorbent material it is important that the absorbent material have an acoustic impedance which is comparable to that of the pipe walls so that an appreciable amount of vibration energy is absorbed by the vibration absorbent material. If, for example, the acoustic impedance of the vibration absorbent material were vastly different from that of the pipe walls, all of the vibration waves would be reflected at the interface of the walls and the vibration absorbent material and no beneficial effect would be obtained from the absorption qualities of the material. The acoustic impedance of lead and soft solder is a satisfactory material for the purpose of the present invention since it is a good vibration absorbent material and the interface between the lead or soft solder and most metal materials used in making pipes will pass an appreciable quantity of the vibration energy reaching the same (such as 25–35% and more of the vibration energy).

In some circumstances the strength requirements of the pipe are paramount and it may not be feasible to recess the walls of the pipe. In such case, the lead or other vibration absorbent material can be anchored on the outer periphery of the pipe.

Other aspects of the invention relate to the specific patterns or configurations of the vibration absorbent-holding recesses formed in the pipe walls where such recesses are permitted. The various aspects of the invention and their advantages will be more fully understood upon making reference to the specification to follow, the claims and the drawings wherein:

FIG. 1 shows a longitudinal section through a pipe section constructed in accordance with the present invention and the relationship of the transmitting and receiving transducers mounted thereon with various circuit components utilized with the transducers to form a flowmeter;

FIG. 2 is a fragmentary top plan view, somewhat enlarged, of the pipe section shown in FIG. 1;

FIG. 3 is a fragmentary bottom plan view, somewhat enlarged, of the pipe section shown in FIG. 1;

FIG. 4 is an enlarged, fragmentary section through the pipe shown in FIG. 2, taken substantially along the line 4—4 therein:

FIG. 5 is a top plan view of a pipe section to which a modified form of the present invention has been applied;

FIG. 6 is a somewhat enlarged sectional view through the pipe section of FIG. 5, taken substantially along the line 6—6 therein;

FIG. 7 is a side elevational view of a modified pipe section illustrating still another form of the present invention; and FIG. 8 is a somewhat enlarged transverse section of the pipe of FIG. 7, taken substantially along the line 8—8 therein.

To best understand the invention, it is desirable first to explain the basic components of the flowmeter system illustrated in the drawing and their manner of operation. Then the features of the present invention will be described. Referring now to FIG. 1, the flowmeter there shown is a beam deflection type flowmeter including a pipe section 4 designed to be connected between two pipe sections in a pipe system carrying the fluid to be measured. The pipe section 4 has flanges 6—6 at the ends thereof with bolt or screw-receiving holes 8 therein for connecting the same to similarly flanged portions of a pair of pipes (not shown). A transmitting transducer 5 and a pair of receiving transducers 6a and 6b are adhesively or otherwise secured to the outside of the pipe section 4, and connecting wires 7 extend from these transducer elements to electrical transmitting and receiving circuitry shown in box form. The circuitry preferably includes a direct current meter 11 having a pointer 11c which normally assumes a centered zero position under no flow conditions, and is deflected to the right of this position to a degree dependent on the flow rate when fluid flows through the pipe section 4 in one direction, and to the left of this position to a degree dependent on the flow rate when the fluid flows through the pipe section in the opposite direction.

The transmitting transducer comprises a piezoelectric crystal of quartz, barium titanate, lead zirconate titanate or the like. In one instance, the crystal was a thin square plate $\frac{3}{16}$ inch wide. The transmitting crystal 5 is mounted on a flat portion 14 of the pipe section which is parallel to the longitudinal axis thereof. The flat portion can be formed on a boss or by machining a flat on the pipe section as illustrated. The pipe section at this point preferably has an average wall thickness which is a multiple of half wave lengths at the frequency of the ultrasonic waves to be transmitted therethrough. The thin transmitting crystal illustrated in the drawings is mounted in face-to-face contact with the flat pipe portion 14 to direct an ultrasonic signal at right angles to the longitudinal axis of the pipe section.

A transmitter circuit 22 is provided for energizing the transmitting crystal 5 at an ultrasonic frequency, such as one megocycle (one million cycles per second). The transmitter circuit 22 preferably intermittently energizes the transmitting crystal resulting in pulsations of ultrasonic energy passing through the walls of the pipe section and into the fluid therein. Because of the substantially transverse direction of the transmitted signals, echoes of these pulsations will be received by the receiving crystals as the ultrasonic pulsations rebound against the pipe walls. The echo pulsations diminish in magnitude with time until they substantially disappear. The pulse repetition rate of the transmitter circuit is selected so that the echoes from a given transmitted ultrasonic pulsation substantially decay to zero before the transmission of the next transmitted pulsation.

It is most advantageous that the transmitting crystal 5 generate a directive beam B having oppositely sloping segments S1 and S2 which are substantially linear. The receiving crystals 6a and 6b are spaced respectively to intercept the substantially linear segments S1 and S2 of the beam over the range of flow rates to be measured. The receiving crystals 6a and 6b which may be thin plates of piezoelectric material like the transmitting crystal are mounted on a flat portion 20 on the pipe section 4 which flat portion is located diametrically opposite the flat portion 14 on which the transmitting crystal 5 is mounted. The flat portion 20 is parallel to the longitudinal axis of the pipe section 4 and forms a wall preferably having an average thickness which is a multiple of half wave lengths at the frequency involved. The receiving crystals 6a and 6b are positioned respectively slightly upstream and downstream by the same distance from the transmitting crystal 5. Under no-flow conditions, the receiving crystals are positioned equi-distant from the beam axis to intercept the center points of the linear segments S1 and S2 of the transmitted ultrasonic beam where both crystals receive signals of the beam intensity. Since the transmitted ultrasonic beam is directed transversely of the pipe axis, and the beam is symmetrical with respect to the axis of the beam, longitudinal movement of the beam by the movement of fluid in the pipe section 4 will result in an increase in the signal amplitude intercepted by the downstream receiving crystal and a similar decrease in the signal amplitude intercepted in the upstream receiving crystal provided the linear segments of the beam remain opposite the receiving crystals. This similar increases and decrease of the signals received by the latter crystals upon movement of fluid through the pipe section is not obtained when the transmitted beam is directed at an angle to a transverse line, and a loss of sensitivity results in such case when the outputs of the receiving crystals are divided.

The output of the receiving crystals are respectively fed to separate receiver channels 30-1 and 30-2 which amplify, rectify and filter the resultant output to provide direct current output voltages which are respectively proportional to the magnitude of the ultrasonic signals received by the receiving crystals 6a and 6b. The direct current outputs of the receiver channels 30-1 and 30-2 are most advantageously fed to a suitable divider circuit 32 which provides at the output thereof a voltage which is a measure of the ratio of the two voltages. The divider circuit 32 may be the divider circuit disclosed in a copending application of Leonard Kleinberg entitled "Quotient Circuit," application Serial No. 141,347, filed September 28, 1961 now Patent Number 3,129,463. In the case where the direction of flow is to the right as viewed in FIG. 2, the Kleinberg divider circuit 32 provides a voltage of a first polarity which is a measure of the flow rate involved. Where the direction of flow is to the left as viewed in FIG. 2, the Kleinberg divider circuit produces a negative voltage which is a measure of the flow rate involved. The direct current output of the divider circuit 32 is fed to the direct current meter or indicator 11 which is capable most advantageously of indicating voltages of both possible polarities.

For most accurate results, the signal to noise ratio of the output of the receiving crystals 6a and 6b should be a maximum. Since the transmitting and receiving crystals are located relatively closely together, it is possible that some of the transmitted ultrasonic energy will reach the receiving crystals directly through the walls of the pipe section. The amplitude of the signal reaching the receiving crystals by this path will not vary with the velocity of fluid in the pipe and will introduce an undesired noise component in the output of the receiving crystals.

In accordance with the present invention, means are provided for minimizing the coupling of ultrasonic vibrations between the transmitting and receiving crystals directly through the walls of the pipe section 4. In accordance with the form of the invention shown in FIGS. 1 through 6, this is achieved in part by machining a groove 35 in the flat pipe portion 14 which groove is shown to be circular and surrounds the transmitting crystal 5. A similar circular groove 37 is formed in the flat pipe portion 20 to surround the receiving crystals 6a and 6b. The grooves extend as far into the walls of the pipe section 4 as is feasible considering the strength requirements thereof. Although the design of the grooves 35 and 37 may have an even depth throughout its extent, it is preferred that the bottom of the grooves have a stepped outline so that the average thickness of the pipe section wall is approximately constant throughout the length of the grooves. The stepped outline of the grooves most advantageously is like that shown in copending application Serial No. 168,145, filed January 23, 1962 by Glenn N. Howatt.

Although a substantial reduction in the coupling of ultrasonic energy between the transmitting and receiving transducers 5, 6a and 6b is provided by the grooves 35 and 37 by themselves, substantially improved results are obtained when the grooves 35 and 37 are filled with a vibration absorbent material 40. Lead and lead alloys such as soft solder are particularly good vibration absorbent materials for most applications of the invention to metal pipes. The important consideration is that the acoustic impedance of the vibration absorbent material be sufficiently similar to that of the material out of which the pipe section is made that a significant portion of the vibration energy reaching the grooves 35 and 37 will pass by the boundary or interface between the vibration absorbent material and the defining walls of the grooves as distinguished from being reflected thereby. Lead, for example, has an acoustic impedance of the sufficient order of magnitude of Inconel that about 35% of the vibration energy reaching the interface of the lead and Inconel will pass into the lead. The vibration energy which is reflected at an interface of the groove walls and the lead is to a great extent diverted from the receiving transducer. The improvement in the reduction of the amount of vibration energy reaching the receiving transducers by the expedient of filling the grooves 35 and 37 with lead is striking, being, for example, of the order of magnitude of a 30 percent improvement.

The following are one set of exemplary dimensions for the pipe section and the grooves therein which provides satisfactory results, it being understood that the various dimensions may be varied widely depending upon the particular pipe size and noise limitation specified:

Inside diameter of pipe section—about 2½ inches
Thickness of walls at grooves 35 and 37—about 1/10 inch
Inner diameter of circular grooves 35 and 37—about 1½ inches
Width of grooves 35 and 37—about ½ inch
Average depth of grooves 35 and 37—about ½ inch
Frequency—1 megacycle In some instances it may be undesirable to form recesses in the pipe walls to avoid weakening the same. This may be a problem, for example, where the invention is applied to a pipe system carrying liquids under very high pressure and where the pipe section involved is already designed close to the limits of its strength tolerances. In such case, another form of the present invention is useful in minimizing the coupling of vibration energy between the transmitting and receiving transducers. Refer now to FIGS. 5 and 6 which illustrate this aspect of the invention. The pipe section generally indicated by reference numeral 4' is similar in most respects to the pipe section shown in FIG. 1 and corresponding elements of the two pipe sections have been given similar reference numerals with a prime (') added to the reference numerals of FIGS. 5 and 6. The only difference in the pipe section of FIGS. 5 and 6 is that the flat portions 14' and 20' thereof are not grooved. Instead, annular mounds of lead 40' are soldered or otherwise secured on the outer surface of the flat portions 14' and 20' of the pipe section. The transmitting and receiving transducers 5, 6a and 6b are respectively positioned within the circle of the annular mounds of lead 40'. Since the acoustic impedance of the annular lead mounds 40' is of a similar order of magnitude to that of the metal out of which the pipe section is made, the sound will pass through the interface therebetween and be absorbed to a substantial extent within the body of the lead.

The sound absorbent qualities of this form of the invention are not as great as that in the form of the invention shown in FIGS. 1 through 4 since the ratio of the amount of vibration conductive metal in the pipe section to the amount of lead is greater in the grooved form of the invention of FIGS. 2 through 4. Also the grooves disrupt or decouple much of the vibration waves reflected from the interface of the lead and pipe walls as explained above. The sound absorbent qualities of the form of the invention shown in FIGS. 5 and 6 can be improved, however, if desired by adding additional amounts of lead to other portions of the pipe section 4 between the transmitting and receiving transducers.

Refer now to the embodiment of the invention shown in FIGS. 7 and 8 which represent a modification of the form of the invention which fills recesses in the pipe section with lead. In the form of the invention illustrated in FIGS. 7 and 8, a modified pipe section 4" is provided with transverse and lateral bores 43 and 45 cut into the pipe walls, although this form of the invention may comprise either the lateral or axial bores alone. The lateral bores 43 in the illustrated embodiment of the invention comprise a pair of large bores located midway along lines extending between the transmitting and receiving transducers. The diameter of the bores 43 is sufficient to encompass a width which is preferably at least equal to the spacing between the outer sides of the receiving transducers 6a and 6b. The lateral bores 43, which are filled with a sound absorbent material 50 like lead, are in the path of acoustic energy passing between the transmitting and receiving transducers via the walls of the pipe section and thus reduce the amount of vibration energy reaching the receiving transducers by a combination action involving vibration absorption in the lead and disruption of the vibration waves moving around the pipe section toward the receiving transducers which may be reflected at the interface of the lead and the bore walls.

The axial bores 45 provide a means for increasing the vibration absorbent areas of the pipe section. As illustrated, a number of circumferentially spaced axial bores 45 are positioned on both sides of the transmitting transducer between the transmitting and receiving transducers. These bores are filled with lead or similar sound absorbent material 50'. The axial bores 45 preferably extend the full length of the pipe section although they could be formed to extend only in the regions of the pipe section containing the transmitting and receiving transducers.

The present invention has thus provided a number of different arrangements for reducing the coupling of vibration energy between spaced transmitting and receiving transducers mounted on the outside of a pipe wall. It should be understood, however, that many modifications may be made in the specific forms of the invention described above without deviating from the broader aspects of the invention.

In the claims, the expression "closely matching" used to describe the acoustic impedance of the vibration absorbent material relative to that of the conduit walls is to be interpreted to mean that the matching is sufficiently close that at least about 25% of the vibration energy reaching the interface therebetween will pass through the interface.

I claim:
1. In an ultrasonic flowmeter comprising a conduit section carrying the fluid to be measured, transmitting transducer means mounted on the outside of the conduit section to direct an ultrasonic beam through the walls of the conduit section into the fluid therein, and receiving transducer means mounted on the outside of the conduit section on the opposite side from that on which the transmiting tranducer is mounted to receive ultrasonic signals transmitted from said transmitting transducer means through said fluid, the improvement comprising: decoupling means between said transmitting and receiving transducer means for minimizing coupling of vibrations therebetween directly through the conduit section walls, said decoupling means comprising a vibration absorbent material secured to the conduit section walls on both sides of the transmitting transducer means in directions between the transmitting and receiving transducer means, said vibration absorbent material being completely on the outside of the conduit section walls where contact between the vibration absorbed material and the conduit section walls is made solely at the inner most surface of the vibration absorbent material and the continuity of the conduit section walls is not disturbed thereby, said vibration absorbent material having an acoustic impedance which closely matches that of the conduit section walls to permit passage of a substantial part of the vibration waves through the interfaces of the conduit section walls and the absorbent material.

2. In an ultrasonic flowmeter comprising a conduit section carrying the fluid to be measured, transmitting transducer means mounted on the outside of the conduit section to direct an ultrasonic beam through the walls of the conduit section into the fluid therein, and receiving transducer means mounted on the outside of the conduit section in spaced relation to said transmitting transducer means to receive ultrasonic signals transmitted from said transmitting transducer means through said fluid, the improvement comprising: decoupling means between said transmitting and receiving transducer means for minimizing coupling of vibrations therebetween directly through the conduit section walls, and said decoupling means comprising recesses in the conduit walls between and in spaced relation to the transmitting and receiving transducer means, wherein the conduit walls separates the transducer means from the recesses said recesses extending part way through the conduit walls, a vibration absorbent material filling said recesses and having an acoustic impedance which closely matches that of the conduit section walls to enable passage of a significant portion of the vibration waves by the interface of the conduit section walls and the absorbent material which strikes the same.

3. An ultrasonic flowmeter comprising a conduit section carrying the fluid to be measured, transmitting transducer means mounted on the outside of said conduit section to direct an ultrasonic beam through the walls of the conduit section into the fluid therein, receiving transducer means mounted on the outside of said conduit section at a point spaced from said transmitting transducer means to receive ultrasonic signals transmitted from said transmitting transducer means through said fluid, and decoupling means between the transmitting and receiving transducer means for minimizing coupling of vibrations therebetween directly through the conduit sections walls, said decoupling means including at least one recess extending part way through the conduit section walls and surrounding and in spaced relation to said transmitting transducer means where the conduit walls separate said ring of absorbent material from said transmitting transducer means, all of these recesses filled with a vibration absorbent material to minimize coupling of vibration energy therebeyond in both circumferential and longitudinal directions from said transmitting transducer means, said vibration absorbent material having an acoustic impedance which closely matches that of the conduit section walls to enable passage of a substantial amount of the vibration waves by the interfaces of the conduit section walls and the absorbent material which strike the same.

4. An ultrasonic flowmeter comprising a conduit section carrying the fluid to be measured, transmitting transducer means mounted on the outside of said conduit section to direct an ultrasonic beam through the walls of the conduit section into the fluid therein, receiving transducer means mounted on the outside of said conduit section at a point spaced from said transmitting transducer means to receive ultrasonic signals transmitted from said transmitting transducer means through said fluid, and decoupling means between the transmitting and receiving transducer means for minimizing coupling of vibrations therebetween directly through the conduit section walls, said decoupling means including a ring of vibration absorbent material surrounding and in spaced relation to said transmitting transducer means wherein the conduit walls separates the transducer means from the recesses to minimize coupling of vibration energy therebeyond in both circumferential and longitudinal directions, vibration absorbent material being completely on the outside of the conduit section walls where contact between the vibration absorbent material and the conduit section walls is made solely at the innermost surfaces of the vibration absorbent material, and the continuity of the conduit section walls is not disturbed thereby, said vibration absorbent material having an acoustic impedance which closely matches that of the conduit section walls to permit passage of a substantial part of the vibration waves through the interfaces of the conduit section walls and the absorbent material.

5. In an ultrasonic flowmeter comprising a conduit section carrying the fluid to be measured, transmitting transducer means mounted on the outside of the conduit section to direct an ultrasonic beam through the walls of the conduit section into the fluid therein, and receiving transducer means mounted on the outside of the conduit section in spaced relation to said transmitting transducer means to receive ultrasonic signals transmitted from said transmitting transducer means through said fluid, the improvement comprising: decoupling means between said transmitting and receiving transducer means for minimizing coupling of vibrations therebetween directly through the conduit section walls, said decoupling means comprising a number of longitudinally extending and circumferentially spaced recesses in said conduit section walls extending part way through the thickness of the conduit walls, and vibration absorbent material filling said recesses and having an acoustic impedance which closely matches that of the conduit section walls to reduce reflections of the vibration waves at the interfaces of the conduit section walls and the absorbent material.

6. In an ultrasonic flowmeter comprising a conduit section carrying the fluid to be measured, transmitting transducer means mounted on the outside of the conduit section to direct an ultrasonic beam through the walls of the conduit section into the fluid therein, and receiving transducer means mounted on the outside of the conduit section in spaced relation to said transmitting transducer means to receive ultrasonic signals transmitted from said transmitting transducer means through said fluid, the improvement comprising: decoupling means between said transmitting and receiving transducer means for minimizing coupling of vibrations therebetween directly through the conduit section walls, said decoupling means comprising a number of longitudinally extending and circumferentially spaced bores formed in said conduit section walls and vibration absorbent material filling said bores and having an acoustic impedance which closely matches that of the conduit section walls to reduce reflections of the vibration waves at the interfaces of the conduit section walls and the absorbent material.

7. In an ultrasonic flowmeter comprising a conduit section carrying the fluid to be measured, transmitting transducer means mounted on the outside of the conduit section to direct an ultrasonic beam through the walls of the conduit section into the fluid therein, and receiving transducer means mounted on the outside of the conduit section in spaced relation to said transmitting transducer means to receive ultrasonic signals transmitted from said transmitting transducer means through said fluid, the improvement comprising: decoupling means between said transmitting and receiving transducer means for minimizing coupling of vibrations therebetween directly through the conduit section walls, said decoupling means comprising a number of longitudinally extending and circumferentially spaced bores formed in said conduit section walls and opening onto at least one end of the conduit section, and vibration absorbent material filling said bores and having an acoustic impedance which closely matches that of the conduit section walls to reduce reflections of the vibration waves at the interfaces of the conduit section walls and the absorbent material.

8. In an ultrasonic flowmeter comprising a conduit section carrying the fluid to be measured, transmitting transducer means mounted on the outside of the conduit section to direct an ultrasonic beam through the walls of the conduit section into the fluid therein, and receiving transducer means mounted on the outside of the conduit section in spaced relation to said transmitting transducer means to receive ultrasonic signals transmitted from said transmitting transducer means through said fluid, the improvement comprising: decoupling means between said transmitting and receiving transducer means for minimizing coupling of vibrations therebetween directly through the conduit section walls, said decoupling means comprising at least one pair of lateral bores on opposite sides of the conduit between and spaced from said transmitting and receiving transducer means and extending part way through the conduit section walls, and a vibration absorbent material filling said bores and having an acoustic impedance which closely matches that of the conduit section walls to reduce reflections of the vibration waves at the interfaces of the conduit section walls and the absorbent material.

References Cited by the Examiner

UNITED STATES PATENTS

| 2,274,262 | 2/42 | Wolff | 73—194 |
| 2,515,221 | 7/50 | Henning | 73—194 |
| 2,874,568 | 2/59 | Petermann | 73—194 |
| 2,912,856 | 11/59 | Kritz | 73—194 |

OTHER REFERENCES

DelGrosso and Spurlock: The Feasibility of Using Wholly External Ultrasonics to Measure Fluid Flow Within Thick-Walled Metal Pipes, Nov. 12, 1957, Naval Research Laboratory, NRL Report 4967 pp. 8–25, copy in Group 430.

RICHARD C. QUEISSER, *Primary Examiner.*